Sept. 5, 1967  H. E. TRACY  3,339,930
AXIALLY STAGED SELF-ADJUSTING MECHANICAL SEAL
Filed March 18, 1965
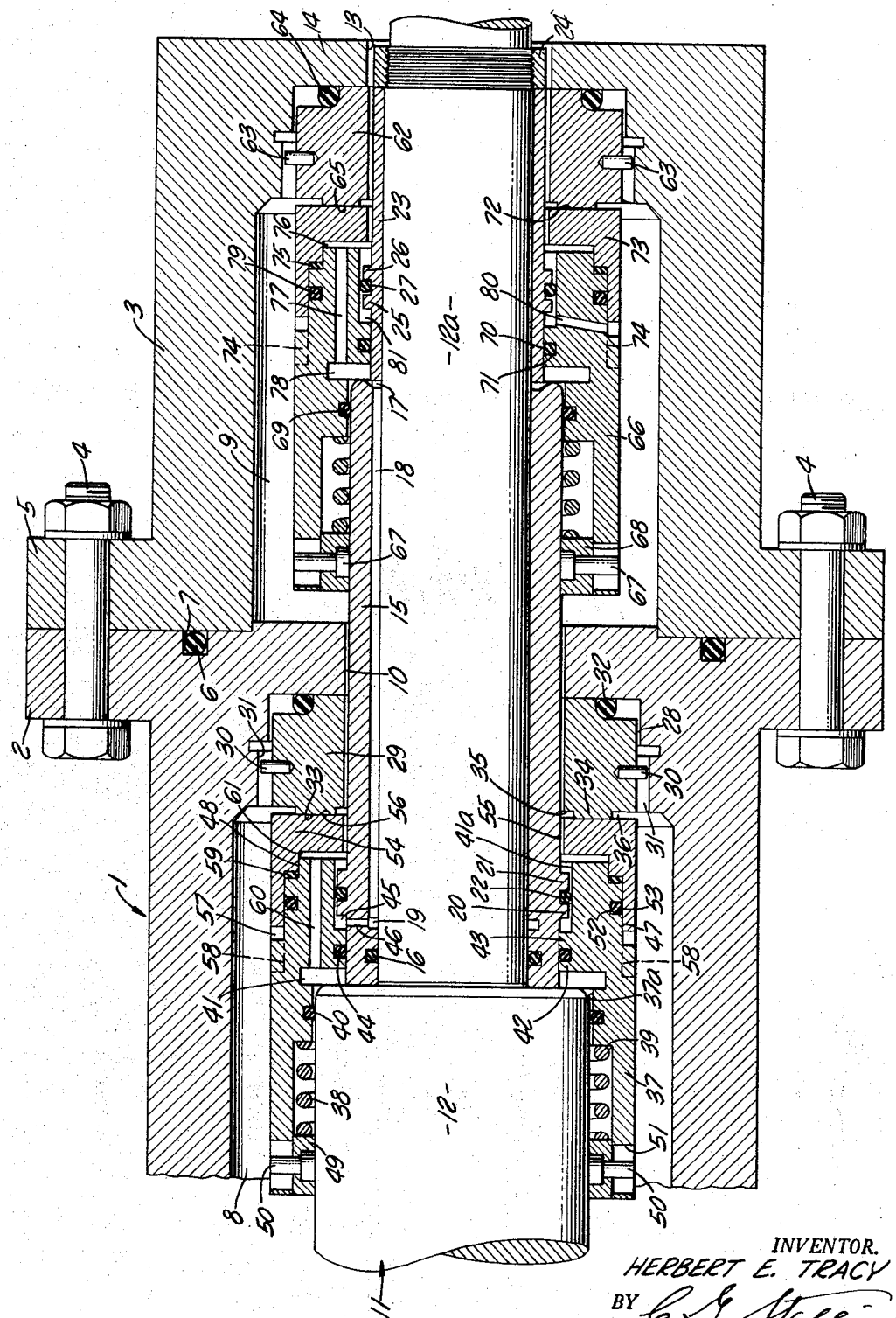
INVENTOR.
HERBERT E. TRACY
BY C. G. Stallings
ATTORNEY United States Patent Office 3,339,930
Patented Sept. 5, 1967

3,339,930
AXIALLY STAGED SELF-ADJUSTING
MECHANICAL SEAL
Herbert E. Tracy, Alhambra, Calif., assignor to Borg-Warner Corporation, Chicago, Ill., a corporation of Illinois
Filed Mar. 18, 1965, Ser. No. 440,780
7 Claims. (Cl. 277—27)

ABSTRACT OF THE DISCLOSURE

An apparatus for sealing a shaft opening in the housing of a fluid pressure vessel having a rotatable shaft therethrough, in which a plurality of axially aligned stuffing boxes are interposed about said opening and surrounding said shaft, each with a fluid pressure responsive mechanical seal, and fluid conduit means arranged to impose pressure existing in each stuffing box on the seal in the associated stuffing box, whereby each seal automatically assumes a proportionate share of the fluid pressure existing in the pressure vessel, regardless of fluid pressure variations.

This invention has to do with mechanical seals and the like, and more particularly, with mechanical seals which are adapted to seal a pump or other rotary shaft against leakage of high pressure fluids, though not limited to such usage.

A primary object of the present invention is to provide an arrangement of two or more seals employed in tandem, that is, axially spaced along a shaft, wherein the seals have an inter-action, so that each carries a proportionate share of the total seal load and a variation in the condition of one seal is reflected in the behavior of the companion seal or seals. In other words, the two seals may be employed to break down the pressure being sealed against, but any variation in the performance of one seal is reflected on the other seal, regardless of which seal suffers the variation.

Mechanical seals used in high pressure fluid pumps are not intended to run "dry," that is, without lubrication. Ordinarily, as is the case here, the seal comprises a nonrotating seal member—usually having a face or surface at an angle (generally vertical) to the rotating shaft—and a similar rotating seal member in juxtaposition thereto with a rotating face or surface complementary to the face of the nonrotating member with one of the members urged against the other to form a "sealing" arrangement. Fluid in relatively small amounts—usually the fluid being pumped—is caused or allowed to flow across the relatively rotating faces to lubricate them. Such an arrangement is necessary, or at least desirable, when the pump pressures present a difficult seal problem. Because of the high pressures and usually high shaft speeds, failure to lubricate properly will cause the seal to deteriorate rapidly with consequent failure.

Heretofore, seals have been arranged in tandem. Primarily, however, each seal has been employed as a separate unit, without the inter-action present in my invention disclosed herein. Therefore, it is an object to provide an arrangement wherein each seal carries its proportionate share of the entire load and adjusts automatically to any condition which varies the share of the load on the other seal. In other words while in the past a malfunction of a first seal in a tandem arrangement would shift the load on a second seal, the malfunction of the second seal would not be compensated for by automatic adjustment of both seals thereto.

Ordinarily, two seals arranged in tandem on a shaft to divide in a predetermined proportion the total load of the fluid under pressure being sealed against will have certain variants which must be compensated for if each of the respective seals is to each handle its proportion of the load. It is not to be expected that each seal will pass or leak the same amount of fluid or at the same rate. Further the initial pressure may be subject to some fluctuations which could overload one seal if it were not able to pass on some of the load to a second seal. It is an object to provide an arrangement which will automatically adjust the operation of both seals to keep the load proportioned.

It is a further object of the present invention to provide an improved arrangement wherein the failure of either seal will not cause the entire sealing capacity to be destroyed, but will result in the other seal assuming the excess load and continuing to operate for some time, usually until the device is serviced and the faulty seal is replaced or repaired.

Other objects and advantages of the invention will be hereinafter described or become apparent to those skilled in the art, and the novel features will be defined in the appended claims.

In the accompanying drawing:

The figure is a longitudinal sectional view, with certain of the parts shown in elevation, of a mechanical seal assembly comprising my invention.

Referring to the drawing, 1 represents a pump or other housing provided with a seal flange 2 on which is mounted at one end a flange cup 3 by any convenient means such as bolts 4 extending through the flange 2 of the housing and a complementary flange 5 of the flange cup 3 as shown in the drawing. A seal flange gasket 6, herein shown as an O-ring, is located in an annular groove 7 in the seal flange 2 to provide a leak-proof seal between the mating faces of the seal flange 2 and flange 5 of the flange cup 3.

The housing 1 is provided with a primary stuffing box 8, and the flange cup 3 has a second or secondary downstream stuffing box 9 in axial alignment with the stuffing box 8 but spaced therefrom by the seal flange 2, there being a shaft opening 10 in said housing made by counterboring through the seal flange 2 and thus providing a communication between the stuffing box 8 and the second stuffing box 9. A rotary shaft 11, having an enlarged end portion 12 and a reduced end portion 12a, extends through the stuffing box 8, the opening 10 of the seal flange 2, the second stuffing box 9 and an end concentric opening 13 to a zone of lower or reference pressure such as to atmosphere in the end wall 14 of the flange cup 3.

The shaft end portion 12a is provided with a grooved shaft sleeve 15 which is mounted for rotation with shaft 11 and abuts against the enlarged end portion 12, and which grooved shaft sleeve 15 extends through the concentric opening 10 with a slight clearance to allow a restricted flow of fluid between the flange 2 and grooved shaft sleeve 15 and well into the second stuffing box 9 as shown in the drawing. This grooved shaft sleeve 15 may be attached to the shaft 12a in any convenient manner, such as, by key means or set screws (not shown), and is provided with a shaft seal gasket 16 at or adjacent its end in juxtaposition to the enlarged portion 12 of the shaft to prevent the loss of fluid from the stuffing box 8 along the area between the shaft 12a and the grooved shaft sleeve 15.

At its other end, the grooved shaft sleeve is undercut as shown at 17, the purpose of which will be apparent from later description. From its undercut end, the grooved shaft sleeve 15 is provided with an axially extending groove 18 which terminates at an annular groove 19.

The outer circumference of the grooved shaft sleeve 15 has two spaced bosses 20 and 21 formed thereon with a gasket 22 between the bosses as shown.

A second shaft sleeve 23 extends axially on shaft 12a from the end of grooved shaft sleeve 15 to the opening 13 in the end wall 14 of the flange cup 3 and is also attached to the shaft in any convenient manner (not shown) to rotate therewith. The grooved shaft sleeve 15 and second shaft sleeve 23 are further held against axial movement by threaded ring 24 threaded onto shaft 11 as shown.

It is noted that sleeve 23 is also provided with a pair of spaced apart bosses 25 and 26 on its outer circumference, between which is located the gasket or O-ring 27. Also, it will be observed that second shaft sleeve 23 is positioned so as not to interfere with the entrance to the groove 18, to which the slight undercutting at 17 contributes.

Located within a counterbore 28 of the primary stuffing box 8 is a non-rotating seal ring 29 which is concentric with the slotted shaft sleeve 15 and with slight clearance therefrom to allow a restricted fluid flow between the non-rotating seal ring 29 and the sleeve 15; in other words, a fluid communication between the stuffing box 8 and the second stuffing box 9 through the shaft opening 10. This stationary seal ring 29 is made of any suitable material, such as, metal or carbon, is preferably press-fitted in place, and is held against rotation by any suitable means such as one or more lock-pins 30 which fit into slots 31 formed in the inner surface of the counterbore of stuffing box 8. The seal ring 29 rests against the back surface or wall of the counterbore 28, and a seat gasket 32 seals against the passage of fluid between the seal ring 29 and the back wall of the counterbore. The seal ring 29 is provided with a seal face 33 which is on an annular boss 34, the friction surface of which is preferably lapped for smoothness in the well known way. The annular boss 34 is located radially outwardly from the inner radius of the seal ring 29, thus forming an annular space 35 in communication with the fluid path to secondary stuffing box 9; and the boss 34 is likewise located inwardly from the outer radius of the seal ring 29, thus forming an annular space 36 in communication with the fluid in the stuffing box 8. The friction face 33 is preferably vertical to the shaft 11.

Mounted on the shaft 11 and grooved shaft sleeve 15, and axially movable thereon, is a spring holder 37, one portion of which is counterbored at 37a, which rests on the enlarged end 12, the spring holder being adapted to receive and retain the coil spring 38, the counterbore end forming a shoulder 39 against which one end of the spring 38 rests. A seal ring 40 is located in an internal annular groove in the counterbore of the spring holder 37 and forms a fluid tight seal with the enlarged portion 12 of the shaft 11.

The counterbore 37a extends past the enlarged portion 12 of the shaft and terminates in an annular chamber 41 formed by a mill cut. From its other end, the spring holder is bored at 41a to fit on the sleeve bosses 20 and 21, and in turn is provided with the internal spaced bosses 42 and 43, between which is the annular seal gasket or O-ring 44. It is noted that in its assembled position, the boss 43 on the spring holder is spaced axially from sleeve boss 20 whereby the annular chamber 45 is formed. The annular chamber 45 is connected to the annular groove 19 of the sleeve 15 by one or more holes 46 through the sleeve 15.

On its outer circumference, the spring holder 37 is of reduced diameter as shown at 47, and of still further reduced diameter as shown at 48.

At its other end, the spring holder 37 rides over a seal drive collar 49 mounted on and attached to the shaft 11 (attaching means not shown, but may be any convenient means such as set screws), in which collar is located the drive pins 50. These drive pins extend through a slot 51 in the spring holder 37 and transmit the rotation of shaft 11 to the spring holder 37 to drive the latter. The collar 49 serves as a seat against which the spring 38 is retained.

In the arrangement described, the spring holder 37 is urged by the spring 38 toward the right, as shown in the drawing, but is able to move axially in either direction a limited amount under the influence of pressure forces existing in the stuffing box 8 as will be evident from the drawing.

There is provided on the reduced outer diameter 47 of the spring holder 37 an annular seal groove 52 in which is located an O-ring seal 53. A rotating seal ring 54, which is counterbored therefor, is mounted concentrically on the reduced outer diameters 47 and 48 of the spring holder 37, and extends radially inward past the end of the spring holder 37, its inner diameter having a slight clearance to permit a restricted fluid flow between its inner diameter and the outer diameter of the grooved sleeve 15. This clearance is designated at 55. On its vertical face 56, the seal ring 54 is yieldingly urged against the stationary face 33 of the non-rotating seal ring 29. The seal ring 54 is made of any desirable material such as carbon, metal, or other suitable substance. It is noted that the seal ring 54 is rotated by means of the axially extending drive ears 57 which extend into mating axial slots (shown in dotted lines) 58 on the outer circumference of the spring holder 37. Thus the seal ring 54 is permitted limited axial movement. A rubber or the like washer 59 is provided between the seal ring 54 and the spring holder 37, such washer 59 being mounted on the off-set end portion due to the reduction of the outer diameter of the spring holder 37 from the diameter shown at 47 to the diameter shown at 48.

At least one axially extending hole 60, extending from the space 61 between the spring holder 37 and seal ring 54, on the one hand and the chamber 41, on the other, is bored in the spring holder 37, whereby fluid pressure existing in the space 61 will be communicated to the chamber 41.

In a generally similar manner, a seal arrangement exists in the second stuffing box 9. Since minor details of construction are similar, many of them will be omitted in describing the arrangement thereof.

In the secondary stuffing box 9, a second stationary ring seal 62 of any desired material, is shown as located so as to abut against the end wall 14 on the flange cup 3 and surrounding the sleeve 23, but spaced therefrom to allow a restricted passage to a zone of lower pressure, such as atmosphere, at 13. This ring seal 62 is held against rotation by any desired means such as the lock pin 63 and is sealed with respect to the end wall 14 by the seal gasket 64. The stationary ring seal 62 is provided with a vertical stationary face 65.

Located in the secondary stuffing box is a second spring holder 66, one end of which is carried on the grooved shaft sleeve 15 and is drivingly attached thereto by means of the drive pin 67 and seal drive collar 68 in a manner similar to the arrangement of the primary spring holder 37 on the enlarged shaft portion 12. The spring holder 66 is capable of limited axial movement, and extends past the end of the grooved sleeve 15 onto the adjacent end of the shaft sleeve 23.

A spring holder gasket seals the space between the sleeve 15 and the spring holder 66. This gasket is located in an annular groove 69 in the spring holder 66. Also, the second shaft sleeve 23 and the spring holder 66 have the space therebetween sealed by a gasket 70 located in an annular groove 71 on the inner diameter of the spring holder 66.

Carried on the end of the spring holder 66 is a rotating seal ring 73 having a rotating face 72 which is complementary to the stationary face 65 of the stationary seal 62. This rotating face 72 comprises the friction surface of rotating seal 73 which surrounds the second shaft sleeve interlocking slots and fingers located at 74 as indicated by dotted lines in the drawing. A fiber or rubber washer 75 maintains the axial spacing between the rotating seal ring 73 and the spring holder 66 whereby there exists a space 76 between the end of said spring holder 66 and said rotating seal ring 73. One or more horizontal holes 77 is provided in the spring holder 66 extending between the space 76 and the annular chamber 78 provided in the spring holder 66 in the area of the end of the sleeve 15 and the adjacent end of the second shaft sleeve 23. Thereby the pressure in the space 76 and in the chamber 78 is equal, and in turn, is equal with the pressure in the axially extending groove 18 for the reasons hereinafter stated. Preferably, a seal in the form of an O-ring 79 is provided between the spring holder 66 and the rotating seal 73, the seal here shown as located in an annular groove on the outer circumference of the spring holder 66.

In this arrangement there is also a port 80 extending through the spring holder 66 and into the chamber 81, the port likewise being open to the pressure in the secondary stuffing box 9 through the space between the mating portion of the rotating ring 73 and the spring holder 66 indicated at 74. Thus, the pressure in the secondary stuffing box will be exerted on the spring holder 66 through the port 80 and will tend to urge the spring holder 66 and rotating face 72 away from the stationary face 65.

It will thus be evident that the operation of the device is as follows:

Analysis of the operation of the seal assembly, starting with the operation of the device located in first stuffing box 8, indicates that the net force due to fluid pressure urging the face contact of the rotating seal ring 54 with the non-rotating seal ring 29 at the area of the seal face 33 is the force being exerted between the inner diameter of the O-ring 44 and the outer diameter of the seal face 33. The variable factor of this force is the force existing between the inner diameter of the O-ring 44 and the outer diameter of the O-ring 22, which because of the communication of the pressure existing in stuffing box 9 through shaft opening 10, and clearance 55, to the space 61 and through the port 60 into the annular chamber 41 reflects the pressure in the chamber or stuffing box 9 on the back of the spring holder 37 in the area of the annular chamber 41.

This pressure being exerted on the back of the spring holder, as above pointed out, is a function of the leakage between the seals, namely, the seal in stuffing box 8 and the seal in stuffing box 9. In this connection, the pressure in the primary stuffing box 8 across the face of the seal ring 29, that is across the face 33, will be instrumental in establishing the pressure in the stuffing box 9. Any increase in the leakage across the face 33, will result in building up the pressure in the stuffing box 9 and (unless released to atmospheric) will be reflected back into the annular chamber 41. This, in turn, increases the pressure urging the rotating seal ring 54 against nonrotating seal ring 29. The existence of atmospheric pressure in the annular chamber 45 thus relieves the pressure in chamber 41 of any counterbalancing action in an area in 41 corresponding to the radial extent of the annular chamber 45, resulting in a net force against the rotating seal ring 54 as represented by the pressure on the corresponding area in 41. Conversely, an absence or lessening of pressure in the annular chamber 41 will allow the rotating sealing ring 54 to be moved by the pressure in the fluid being pumped to a position of less sealing effectiveness with respect to the vertical faces 56 and 33. Thus, more fluid will flow across the area between these faces 33 and 56 and through the shaft opening 10 into stuffing box 9. This additional fluid will (to the extent it is not vented to atmosphere) build up the pressure in stuffing box 9, will be reflected back through the passage or shaft opening 10, into the space 61 and through the hole 60 into the annular chamber 41, again exerting pressure urging the rotating ring 54 against the stationary ring 29.

In connection with the above, it is noted that the passage of pressure fluid from the stuffing box 8 along the area between the faces 56 and 33, depending on the area involved, reduces the pressure of the fluid in the anular space 35 compared with that in the stuffing box 8.

In stuffing box 9, as the pressure builds up, leakage takes place across the face 65 and the face 72 of the fixed seal ring 62 and rotatable seal ring 73 respectively. This leakage will tend to drop the pressure in the stuffing box 9 with the consequence that there is less pressure reflected back into the annular chamber 41. Thus, if the leakage across 33 is greater than the leakage across 65, the pressure on the spring holder 37 urging the rotatable seal face 56 against the fixed seal face 33, will increase, causing a tightening or slowdown of leakage across 33. Conversely, an increase in the pressure of stuffing box 9 will result in that pressure being fed through the port 80 into the annular chamber 81 which, in turn, lightens the load on the seal face 72 causing more leakage across the faces 72 and 65, and tending to bring the system into "balance." By way of explanation, the pressure in the port 80 is effective to vary the balance by the variable due to the inner diameter of the gasket 70 and the outer diameter of the O-ring 27. In other words, an analysis of the pressures on the spring retainer or holder 66 will show that the variable is that reflected in the areas last above mentioned.

Thus it will be seen that the two seals are constantly "hunting" for adjustment more or less simultaneously. If one seal leaks or flows more than the other, the tendency is offset by a "narrowing" effect between the relative rotating faces caused by a build-up in pressure on the control surfaces in the one seal, and is also offset by a "spreading" effect between the relative rotating faces in the other seal causing a greater flow in that seal. This constant interaction tends to proportion the load between the two seals. Thus the seals will be proportionately maintained in a state that may be termed "balance" although it is believed that an actual analysis would indicate that there is a constant ripple or wave action across the respective faces of the relatively rotating sealing elements in each of the two chambers or stuffing boxes 8 and 9, which constant ripple or wave action is compensated for immediately by automatic adjustment. The compensation taking place in one stuffing box is at least partially effected by the condition existing in the other stuffing box. With such an automatic adjusting feature, so that each seal resists a portion of the primary pressure being sealed against, extremely heavy pressures may be "balanced" so that they are divided between two or more seals in combination.

The description herein has been with respect to two seals but the same principles can apply to three or more axially staged seals.

By way of an example of this pressure division by two seals, the pressure in stuffing box 8 might be on the order of 3000 p.s.i. This pressure causes a flow across the faces 33 and 56 of the relatively rotating sealing elements, and builds up the pressure in the second stuffing box 9. Because the resistance to flow across the faces 56 and 33 reduces the pressure of the liquid leaving stuffing box 8, that in stuffing box 9 may reach a figure of perhaps 1500 pounds before the two seals are operating in constant synchronism. This 1500 pounds is "reverse" pressure on the seal against which the initial 3000 pounds is exerted, and thus counters the 3000 p.s.i., dropping the load on the first seal to 1500 p.s.i. It is noted that any flow across the faces 65 and 72 would be from the pressure in the stuffing box 9 to the outlet pressure through 13, in this example atmospheric. Any such flow, which is relatively minor in volume, could be trapped and returned to the system but flow is necessary and desirable for seal lubrication purposes and to prevent overload. It is further noted that the annular space 76, the port or hole 77, the annular chamber 78, the axially extending groove 18, the annular groove 19, the hole 46, and the annular chamber 45 are all at discharge or atmospheric pressure, such as exists at 13.

It is to be observed that the grooved shaft sleeve 15 is common to both the seal arrangement in stuffing box 8 and the arrangement in stuffing box 9, comprising an element of each seal which extends into both stuffing boxes and assists in the regulation and balance of both seals. The two seals differ essentially in that the annular space 45 of the first seal reflects atmospheric pressure thus allowing the additional loading on the face area defined by 56 and 33, while the more or less corresponding annular chamber 81 of the secondary seal reflects the pressure existing in the stuffing box 9 and thereby tends to unload the area 65–72 between the relatively rotating seals performing just the opposite function to that performed in the seal of stuffing box 8.

While I have herein shown and described one embodiment of my present invention, such description refers only to the relative position of the parts and is not intended to be a limitation of the invention; it being understood that the appended claims should be construed as broadly as the prior art will permit.

I claim:

1. Sealing means for a shaft opening in a housing containing fluid under pressure and having a rotatable shaft extending therethrough, comprising:
   a plurality of axially aligned stuffing boxes about said shaft opening and surrounding said shaft;
   means for fluid pressure communication between said stuffing boxes;
   mechanical fluid pressure responsive sealing means in each of said stuffing boxes; and
   means automatically adjusting each mechanical sealing means responsive to fluid pressures existing in all of said stuffing boxes, whereby each mechanical sealing means bears a proportionate share of the pressure in said housing regardless of the variations thereof.

2. Sealing means for a shaft opening in a housing containing fluid under pressure and having a rotatable shaft therein;
   primary and secondary stuffing boxes surrounding said shaft and having fluid pressure communication therebetween;
   fluid pressure responsive self adjusting mechanical sealing means in each of said stuffing boxes;
   and means responsive to fluid pressure existing in both the primary and the secondary stuffing boxes regulating said self adjusting means, whereby the pressure on the seal means in said housing is proportioned between the seal means of the primary and secondary stuffing boxes regardless of variations in pressure of the fluid in said housing.

3. Sealing means for a shaft opening in a housing containing fluid under pressure to be sealed against and having a rotatable shaft therein, those improvements comprising:
   a primary stuffing box surrounding said shaft and containing a mechanical sealing means including a fixed seal ring having a sealing face and a movable seal ring having a sealing face, and means automatically adjusting the relative position of said seal faces to control the flow of fluid across said faces;
   a secondary stuffing box surrounding said shaft and containing a mechanical sealing means including a fixed seal ring having a sealing face and a movable seal ring having a sealing face and means automatically adjusting the relative position of said sealing faces to control the flow of fluid across said faces;
   fluid pressure communicating means between said stuffing boxes;
   means communicating a reference pressure such as atmospheric on the mechanical sealing means of both the primary and secondary stuffing boxes;
   and means in each stuffing box responsive at least in part to pressure of fluid in the other stuffing box, regulating the relative positions of said fixed and movable sealing faces for each of the respective stuffing box mechanical seals.

4. Sealing means for a shaft opening in a pump housing containing fluid under pressure and having a rotatable shaft extending therethrough, those improvements comprising in combination:
   a primary stuffing box surrounding said shaft;
   a secondary stuffing box also surrounding said shaft;
   fluid communication means between said primary and secondary stuffing boxes;
   a mechanical sealing means in the primary stuffing box having a fixed sealing face and also having a movable sealing face, and positioned between said fluid under pressure and the fluid communicating means for said stuffing boxes;
   a mechanical sealing means comprising a fixed sealing face and a movable sealing face in said secondary stuffing box;
   and means urging said movable sealing face in said primary stuffing box into sealing engagement with said fixed sealing face, said means being responsive to the pressure of fluid in said secondary stuffing box;
   and means in said secondary stuffing box responsive to a differential in pressure between the pressure in the fluid from the primary stuffing box and the reference pressure urging the movable sealing face apart from the fixed sealing face in said secondary stuffing box and thereby regulating the relative pressure in both of said stuffing boxes, whereby each said mechanical seal carries its proportionate share of the maximum pressure existing in the primary stuffing box.

5. Sealing means for a shaft opening in a pump housing having fluid under pressure and having a rotatable shaft extending therethrough, those improvements comprising in combination:
   stuffing boxes axially aligned and surrounding said shaft, and being spaced apart by flange means;
   a shaft sleeve grooved on its internal diameter and mounted on said shaft for rotation therewith, said sleeve extending into both said stuffing boxes;
   fluid communicating passage means between the said sleeve and flange means whereby a restricted flow of fluid may take place between said primary and secondary stuffing boxes;
   mechanical seal means in each stuffing box comprising in each instance a fixed sealing face means mounted in said stuffing box, axially movable sealing face means cooperating with said fixed sealing face means to restrict the flow of fluid therebetween;
   reference pressure such as atmospheric communicated to each stuffing box;
   means responsive in part to the difference between the pressure in said secondary stuffing box and said reference pressure urging the axially movable sealing face on said primary stuffing box in a direction to close the space between said movable and fixed seals;
   and means responsive in part to the difference between the pressure from the primary stuffing box and the reference pressure to open the space between the fixed and rotating seals in the secondary stuffing box thereby to reduce the pressure in the secondary stuffing box.

6. A shaft seal in accordance with claim 1, wherein the fluid pressure to which the means automatically adjusting each mechanical sealing means is responsive, includes fluid pressure existing in an associated stuffing box and a reference fluid pressure such as atmosphere.

7. A shaft seal in accordance with claim 1, wherein the means for automatically adjusting each mechanical sealing means is operable to adjust the mechanical sealing means in one stuffing box and the mechanical seal means in an adjacent stuffing box, substantially simultaneously in opposite directions.

References Cited

UNITED STATES PATENTS 2,383,862 8/1945 Hornschuch _____ 277—91
2,723,868 11/1955 Hartranft _____ 277—73 X
3,031,197 4/1962 Wilkinson _____ 277—65 X
3,042,414 7/1962 Tracy _____ 277—93 X
3,233,824 2/1966 Johnson _____ 277—64 X

FOREIGN PATENTS 550,642 12/1957 Canada.

LAVERNE D. GEIGER, *Primary Examiner.*

J. S. MEDNICK, *Assistant Examiner.*

UNITED STATES PATENT OFFICE
CERTIFICATE OF CORRECTION

Patent No. 3,339,930                              September 5, 1967

Herbert E. Tracy

It is hereby certified that error appears in the above numbered patent requiring correction and that the said Letters Patent should read as corrected below.

Column 7, line 29, for "mechanical fluid pressure responsive" read -- fluid pressure responsive mechanical --.

Signed and sealed this 15th day of October 1968.

(SEAL)
Attest:

Edward M. Fletcher, Jr.                                EDWARD J. BRENNER

Attesting Officer                                        Commissioner of Patents